US007630285B2

(12) United States Patent
Masuda et al.

(10) Patent No.: US 7,630,285 B2
(45) Date of Patent: Dec. 8, 2009

(54) OPTICAL WRITING DEVICE, OPTICAL READING DEVICE, RECORDING MEDIUM WRITING METHOD, AND RECORDING MEDIUM READING METHOD

(75) Inventors: Yoshiyasu Masuda, Tokyo (JP); Takashi Sasaki, Tokyo (JP); Tsunemitsu Takase, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/734,589

(22) Filed: Apr. 12, 2007

(65) Prior Publication Data

US 2007/0189144 A1  Aug. 16, 2007

Related U.S. Application Data

(63) Continuation of application No. 10/470,433, filed as application No. PCT/JP02/12192 on Nov. 21, 2002.

(30) Foreign Application Priority Data

Nov. 26, 2001  (JP) ............................. 2001-359784

(51) Int. Cl.
*G11B 7/00* (2006.01)
(52) U.S. Cl. .................. 369/53.26; 369/47.28
(58) Field of Classification Search ................. None
See application file for complete search history.

(56) References Cited

U.S. PATENT DOCUMENTS

| 5,617,392 | A | 4/1997 | Shim |
| 6,081,490 | A | 6/2000 | Kuroda et al. |
| 6,128,273 | A | 10/2000 | Horie et al. |
| 6,215,742 | B1 | 4/2001 | Kuroda et al. |
| 6,404,713 | B1 | 6/2002 | Ueki |
| 6,496,458 | B2 | 12/2002 | Tsukihashi |
| 6,912,190 | B2 * | 6/2005 | Inokuchi et al. .......... 369/59.15 |
| 7,113,462 | B2 * | 9/2006 | Wang et al. .............. 369/47.39 |
| 7,281,175 | B1 * | 10/2007 | Hayashi et al. ............. 714/704 |
| 2001/0003519 | A1 | 6/2001 | Tsukihashi |
| 2002/0004119 | A1 | 1/2002 | Akimori et al. |

FOREIGN PATENT DOCUMENTS

| JP | 9-7293 | 1/1997 |
| JP | 10-293926 | 11/1998 |
| JP | 2000251419 A * | 9/2000 |
| JP | 2000-285455 | 10/2000 |
| JP | 2001-176194 | 6/2001 |
| JP | 2001-293959 | 10/2001 |

* cited by examiner

*Primary Examiner*—Joseph H Feild
*Assistant Examiner*—Joseph Haley
(74) *Attorney, Agent, or Firm*—Oblon, Spivak, McClelland, Maier & Neustadt, L.L.P.

(57) ABSTRACT

When performing writing and/or reading of information to/from an optical disk provided with a wobble including time axis information, an occurrence of a reading error of the time axis information from the wobble is suppressed so that disabled reading of information from the optical disk and an occurrence of a writing error can be prevented. Evaluated parameters such as a CRC error rate of an ATIP signal, an FMDT jitter amount and a phase error between an ATIP synchronization signal and a frame synchronization signal of writing data are evaluated based on a range of set values. When the evaluated parameter is deviated from the range of set values, writing and reading speeds are changed, thereby increasing the reading accuracy of the wobble signal.

7 Claims, 4 Drawing Sheets

FIG. 4A WOBBLE SIGNAL

FIG. 4B ATIP AFTER FM-DEMODULATION

FIG. 4C FMDT

FIG. 4D FMCK

OPTICAL WRITING DEVICE, OPTICAL READING DEVICE, RECORDING MEDIUM WRITING METHOD, AND RECORDING MEDIUM READING METHOD

CROSS REFERENCE TO RELATED APPLICATIONS

This application is a continuation of U.S. application Ser. No. 10/470,433 filed on Jul. 28, 2003, which is a National Stage of PCT/JP02/12192 filed on Nov. 21, 2002, all of which claim priority to Japanese Patent Application No. 2001-359784 filed on Nov. 26, 2001. The contents of each of these documents are incorporated herein by reference.

TECHNICAL FIELD

The present invention relates to a device for performing writing and/or reading of information to/from an optical recording medium such as an optical disk and an optical card. More specifically, it relates to an optical writing device, a recording-medium-writing method, an optical reading device, and a recording-medium-reading method, which use an optical recording medium provided with a wobble including address information.

BACKGROUND ART

As an optical disk permitting writing of information, there are a CD-R (CD-Recordable) and a CD-RW (CD-Rewritable) for a CD standard, and a DVD-R, a DVD-RW, a DVD+R, a DVD+RW and a DVD-RAM for a DVD standard. For example, a groove is cut in a CD-RW disk substrate with a sine wave shape or the like. The part of a recording layer corresponding to the groove is a recording track. The serpentine of the groove is called as a wobble. To the wobble, FM-modulated positional information, that is, time axis information showing an absolute position on a disk, is written as an ATIP (Absolute Time in Pre-groove) signal.

The ATIP signal is written so that its frequency become 22.05 kHz±1 kHz when an optical disk rotates at a predetermined speed, for example, at a standard speed. One sector of the ATIP signal corresponds with one data sector (2352 bytes) of writing data. When the writing data is written, the writing is performed while synchronizing the sector of the ATIP signal with the data sector of the writing data.

Figure 1:
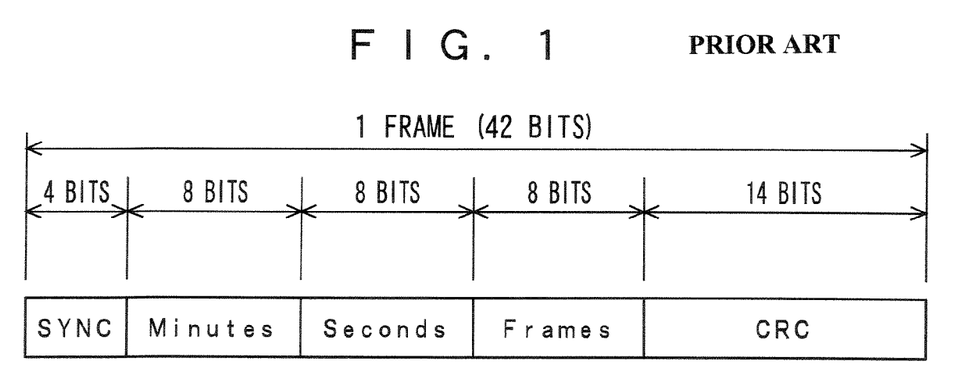
FIG. 1 is a diagram showing a frame structure of an ATIP signal.

FIG. 1 shows the frame structure of an ATIP signal. One frame has 42 bits including first 4-bit SYNC, 24-bit time axis information (minutes, seconds, frame numbers, each for 8 bits), and 14-bit CRC (Cyclic Redundancy Code) as an error detecting code. A CD-RW writing and reading device performs rotational control of the disk, that is, the spindle servo based on the SYNC of the ATIP signal.

In such the writing and reading device, interference elements such as scratch, dirt and fingerprint on a recording surface, mechanical characteristic fluctuation (eccentricity, eccentricity of center of gravity, skew and wobbling), electric characteristic fluctuation (degraded S/N and reflectivity fluctuation), and vibration and shock from outside affect reading of the above ATIP signal. In particular, in recent years, the data writing and reading speeds to and from an optical disk have been increased dramatically. The influence of the interference elements upon the reading of the ATIP signal has been enlarged more and more. When a reading error of the ATIP signal occurs, the spindle servo is unstable. Degradation of the reading characteristic (seek time and transfer rate) and deterioration of the writing characteristic occur. In the worst case, there are problems of disabled writing and reading and occurrence of a writing error.

DISCLOSURE OF THE INVENTION

The present invention has been contrived in the above circumstances and an object of the present invention is to provide an optical writing device, an optical reading device, a recording-medium-writing method and a recording-medium-reading method, which can suppress occurrence of a reading error of time axis information from a wobble so as to prevent disabled reading of information from an optical recording medium and occurrence of a writing error.

An optical writing device according to the present invention has: wobble signal generation means for generating a wobble signal from an electric signal outputted from an optical pickup; evaluation means for evaluating accuracy of the wobble signal generated by the wobble signal generation means; and control means for allowing control, in performing writing to an optical disk, for interrupting a writing operation when the accuracy of the wobble signal evaluated by the evaluation means is deviated from a predetermined range. In addition, it has jitter measurement means for measuring a jitter amount of the wobble signal. The evaluation means evaluates the accuracy of the wobble signal at least based on the jitter amount of the wobble signal measured by the jitter measurement means. Further, an error detecting code is added to the wobble signal. Decoding means performs error detection with the error detecting code at decoding time axis information generated from the wobble signal, and the evaluation means evaluates the accuracy of the wobble signal at least based on the error rate of the error detection. In addition, a synchronization signal for frame synchronization with writing data is added to the wobble signal. Phase error measurement means for measuring a phase error between the synchronization signal and a synchronization signal of the writing data is provided, and the evaluation means evaluates the accuracy of the wobble signal at least based on the phase error measured by the phase error measurement means. In addition, the control means performs control, in performing writing, for interrupting the writing operation, decelerating a writing speed, and restarting the writing operation, when deciding that the accuracy of the wobble signal evaluated by the evaluation means is lower than a lower limit of the predetermined range, and performs control for interrupting the writing operation, accelerating the writing speed, and restarting the writing operation, when deciding that the accuracy of the wobble signal is higher than an upper limit of the predetermined accuracy range.

In addition, an optical reading device according to the present invention has: wobble signal generation means for generating a wobble signal from an electric signal outputted from an optical pickup; evaluation means for evaluating accuracy of the wobble signal generated by the wobble signal generation means; and control means for changing a reading speed set under a CLV or CAV condition, in performing reading from an optical disk, when the accuracy of the wobble signal evaluated by the evaluation means is deviated from a predetermined accuracy range. In addition it has jitter measurement means for measuring a jitter amount of the wobble signal. The evaluation means evaluates the accuracy of the wobble signal at least based on the jitter amount of the wobble signal measured by the jitter measurement means. In addition, an error detecting code is added to the wobble signal. The decoding means performs error detection with the error detecting code at decoding time axis information generated from the wobble signal, and the evaluation means evaluates the accuracy of the wobble signal at least based on the error rate of the error detection. Further, a synchronization signal for frame synchronization with writing data is added to the wobble signal. Phase error measurement means for measuring a phase error between the synchronization signal and a synchronization signal of the writing data is provided. The evaluation means evaluates the accuracy of the wobble signal at least based on the phase error measured by the phase error measurement means.

In addition, a recording-medium-writing method according to the present invention has the steps of: generating a wobble signal from an electric signal from an optical pickup; evaluating accuracy of the wobble signal; and interrupting a writing operation to a recording medium when the evaluated accuracy of the wobble signal is deviated from a predetermined range.

Further, a recording-medium-reading method according to the present invention has the steps of: generating a wobble signal from an electric signal outputted from an optical pickup; evaluating accuracy of the wobble signal; and changing a reading speed set under a CLV or CAV condition when the evaluated accuracy of the wobble signal is deviated from a predetermined accuracy range.

In the present invention, the accuracy of the wobble signal is evaluated based on the jitter amount of the wobble signal, the error detected result of the error detecting code added to the wobble signal, or the phase error between the synchronization signal added to the wobble signal and the synchronization signal of the writing data. When the evaluated result is deviated from the predetermined range, the writing operation is interrupted at writing and then it restarts after the writing speed has been changed. In addition, at reading, the reading speed set under the CLV or CAV condition is changed. Changing the writing and reading speeds allows the reading accuracy of the wobble signal to be increased, thereby preventing disabled reading of information from the optical recording medium and the occurrence of a writing error.

BEST MODE FOR CARRYING OUT THE INVENTION

Figure 2:
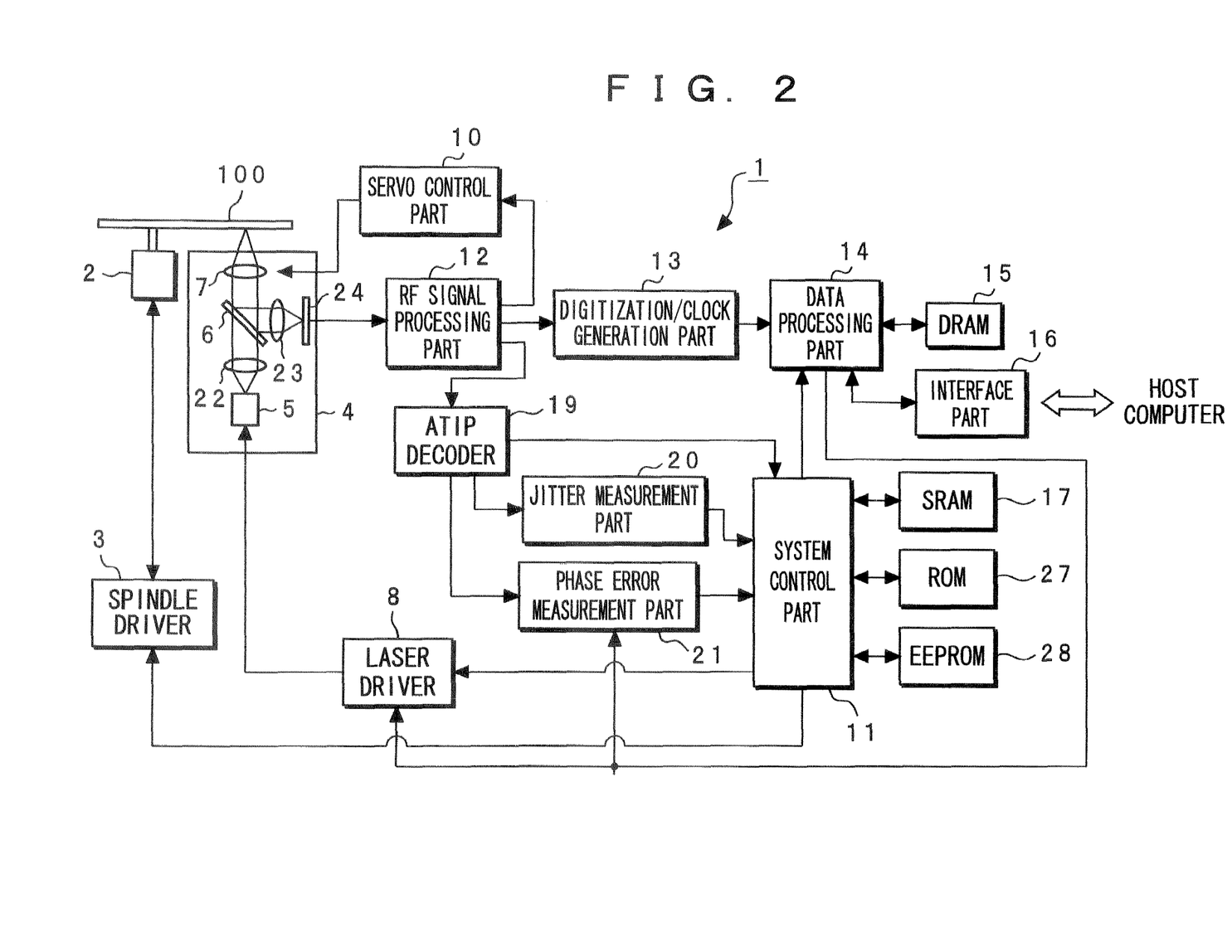
FIG. 2 is a block diagram showing a configuration of an optical writing medium device according to an embodiment of the present invention.

An embodiment of the present invention will be described more in detail with reference to the drawings. FIG. 2 shows a configuration of an optical writing medium device for performing writing and/or reading of information using an optical recording medium.

An optical writing medium device 1 is a device for performing writing and reading of information to/from a disk-like medium 100 such as a CD-RW. The medium 100 is fitted in a spindle motor 2 to be rotatively operated. The spindle motor 2 spins according to a driving of a spindle driver 3 under the control of a system control part 11.

An optical pickup 4 has a semiconductor laser 5 for emitting an optical beam, a collimator lens 22 for converting the optical beam emitted from the semiconductor laser 5 to parallel light, a beam splitter 6 for branching an optical path of the optical beam, an objective lens 7 for focusing the light passing through the beam splitter 6 to irradiate it onto the medium 100, a focusing lens 23 for focusing return light reflected by the medium 100 and reflected by the beam splitter 6, and an optical detector 24 for receiving the return light focused by the focusing lens 23 to convert it to an electric signal.

A laser driver 8 controls the semiconductor laser 5 of the optical pickup 4 to make the output power thereof an optimal power for writing, reading, and erasing, respectively, under the control of the system control part 11.

The objective lens 7 of the optical pickup 4 is movably supported by a biaxial actuator, not shown, in the two-axle directions, namely, in a radial direction of the medium 100 fitted in the spindle motor 2 and in a direction that it is close to and apart from a recording surface of the medium 100. A servo control part 10 controls the biaxial actuator to movably operate the objective lens 7 in the two-axle directions, thereby performing a focus servo and a tracking servo in the optical pickup 4.

In addition, the optical pickup 4 is movably operated in a radial direction of the medium 100 fitted in the spindle motor 2 so as to access a required recording track of the medium 100 by an access mechanism (not shown) operated under the control of the system control part 11.

Output of the optical detector 24 of the optical pickup 4 is supplied to an RF signal processing part 12. The RF signal processing part 12 generates an RF reading signal, a focus error signal, a tracking error signal and a wobble signal from a voltage signal supplied from the optical detector 24. The RF reading signal generated by the RF signal processing part 12 is supplied to a digitization/clock generation part 13.

The digitization/clock generation part 13 performs digitization processing on the RF reading signal supplied from the RF signal processing part 12 to convert it to digital data and supplies the digital data to a data processing part 14. The digitization/clock generation part 13 also generates a clock signal synchronized with the digital data and supplies the generated clock signal together with the digital data to the data processing part 14.

Under the control of the system control part 11, the data processing part 14 EFM-demodulates the digital data supplied from the digitization/clock generation part 13 and performs deinterleave processing and error correction processing with CIRC (Cross Interleave Reed-Solomon Code). The data processing part 14 then performs descramble processing and error correction processing with ECC (Error Correcting Code) on the digital data.

The data subjected to the error correction processing in the data processing part 14 is stored in a buffer memory 15 such as a DRAM and then, it is supplied as reading data to a host computer via an interface 16.

When the writing data is supplied via the interface 16 from the host computer, the data processing part 14 sequentially reads out the writing data from the buffer memory 15 such as a DRAM with the writing data being temporarily stored into the buffer memory 15 and encodes it to a predetermined sector format to add the ECC for error correction to the writing data. Further, the data processing part 14 performs CIRC encode processing and EFM modulation processing on the writing data to generate a writing signal. Then, the writing signal is supplied to the laser driver 8.

On the other hand, the focus error signal and the tracking error signal generated by the RF signal processing part 12 are supplied to the servo control part 10 and the wobble signal is supplied to an ATIP decoder 19, respectively.

The ATIP decoder 19 performs CRC check and decoding processing of the wobble signal supplied from the RF signal processing part 12 under the control of the system control part 11 to generate an ATIP signal showing time axis information. The ATIP signal generated by the ATIP decoder 19 is supplied to the system control part 11 and is also supplied to a jitter measurement part 20 and a phase error measurement part 21. The CRC error rate of the ATIP signal generated by the CRC check is also supplied to the system control part 11.

In addition, when performing the access operation of the optical pickup 4, the system control part 11 controls the access mechanism, not shown, based on the ATIP signal to access the optical pickup 4 to the desired recording track.

The jitter measurement part 20 measures jitter of a signal (FMDT signal) obtained by the ATIP decoder 19 to supply the measured value thereof to the system control part 11.

The phase error measurement part 21 measures a phase error (SYNC phase error) between the frame synchronization signal of the ATIP decoded by the ATIP decoder 19 and the frame synchronization signal of the writing data to supply the measured value thereof to the system control part 11.

The system control part 11 controls the operations of the entire optical writing medium device 1. The system control part 11 also controls the operations of the respective parts of the optical writing medium device 1 using an SRAM 17 as a work area based on a program for operation control stored in a ROM 27.

To an EEPROM 28, ranges of set values of at least the respective CRC error rate of the ATIP signal, FMDT jitter, and SNYC phase error are set.

The system control part 11 performs statistical processing such as simple average or moving average on the respective evaluated parameters of the CRC error rate detected by the ATIP decoder 19, the FMDT jitter amount obtained by the jitter measurement part 20, and the SNYC phase error obtained by the phase error measurement part 21 and compares the results thereof with the ranges of set values. The system control part 11 also performs control, for instance, during writing, for interrupting the writing, for changing (decelerating or accelerating) the writing speed, and for restarting the writing according to a predetermined decision condition, for example, when any one of the three evaluated parameters is deviated from the ranges of set values. The system control part 11 also performs control, during reading, for changing (decelerating or accelerating) the reading speed. Further, an upper limit and a lower limit of the range changing the writing speed and the reading speed can be set and changed.

Next, the operations of writing information to the medium 100 by means of the optical writing medium device 1 according to the present invention will be described.

When writing information to the medium 100, the following processing is first performed in order to make the optical writing medium device 1 into a "ready" state that information can be written to the medium 100.

The medium 100 is fitted in the spindle motor 2. The spindle driver 3 drives the spindle motor 2 under the control of the system control part 11 to rotatively operate the medium 100. In addition, the laser driver 8 drives the semiconductor laser 5 of the optical pickup 4 under the control of the system control part 11 to allow the semiconductor laser 5 to emit an optical beam of a predetermined power.

The optical beam emitted from the semiconductor laser 5 is converted to parallel light by the collimator lens 22, and then, it passes through the beam splitter 6 to reach the objective lens 7 focusing it. The optical beam is irradiated onto the medium 100 rotatively operated by the spindle motor 2. The optical beam irradiated onto the medium 100 is reflected by the medium 100 to become return light including a wobble component. The return light passes through the objective lens 7 to reach the beam splitter 6 reflecting it, and then, is focused by the focusing lens 23 to enter the optical detector 24 to be received. The optical detector 24 performs photoelectric conversion and current-voltage conversion on the received return light to generate a voltage signal corresponding to the return light. The voltage signal generated by the optical detector 24 is supplied to the RF signal processing part 12.

The RF signal processing part 12 generates a wobble signal based on the voltage signal supplied from the optical detector 24 and supplies it to the ATIP decoder 19. The ATIP decoder 19 performs the CRC check and decoding processing of the wobble signal under the control of the system control part 11 to generate an ATIP signal showing SYNC and time axis information for supplying it to the system control part 11.

The system control part 11 controls the driving of the spindle driver 3 based on the ATIP signal so that the medium 100 fitted in the spindle motor 2 can be rotatively operated at a speed set, for example, under a CLV or CAV condition.

According to the above series of processing, the optical writing medium device 1 is brought into the "ready" state that a writing operation of information can be performed on the medium 100.

Thereafter, when the data processing part 14 receives the writing data from the host computer, the data processing part 14 encodes the writing data to a predetermined sector format and then, performs processing for adding the ECC for error correction, CIRC encode processing and EFM modulation processing to generate a writing signal. Then, the data processing part 14 supplies the writing signal with the laser driver 8.

The laser driver 8 drives the semiconductor laser 5 of the optical pickup 4 according to the writing signal supplied from the data processing part 14 under the control of the system control part 11. Thus, the semiconductor laser 5 emits an optical beam of a writing power modulated according to the writing data.

The optical beam emitted from the semiconductor laser 5 is converted to the parallel light by the collimator lens 22, and then, passes through the beam splitter 6 to be focused by the objective lens 7, thereby being irradiated onto the medium 100 rotatively operated by the spindle motor 2. The light beam irradiated by the medium 100 is reflected by the medium 100 to become return light including a wobble component. The return light passes through the objective lens 7 to be reflected by the beam splitter 6, and then, is focused by the focusing lens 23 to enter the optical detector 24 to be received.

The optical detector 24 performs photoelectric conversion and current-voltage conversion on the received return light to generate a voltage signal corresponding to the return light. Then, the voltage signal generated by the optical detector 24 is supplied to the RF signal processing part 12.

The RF signal processing part 12 generates a wobble signal based on the voltage signal supplied from the optical detector 24 and supplies it to the ATIP decoder 19. The ATIP decoder 19 performs the CRC check and decoding processing of the wobble signal under the control of the system control part 11 to generate an ATIP signal showing SYNC and time axis information for supplying it to the system control part 11. The system control part 11 performs control of the access mechanism, not shown and the spindle servo based on the ATIP signal.

Next, the operation of reading information from the medium 100 by means of the optical writing medium device 1 according to the present invention will be described.

When a reading command is supplied from the host computer via the interface 16 to the system control part 11, the system control part 11 controls the operation of the access mechanism, not shown, to travel the optical pickup 4 in the radial direction of the medium 100 fitted in the spindle motor 2 so that the optical pickup 4 can be accessed to a required recording track of the medium 100. In addition, the system control part 11 controls the operation of the laser driver 8 to drive the semiconductor laser 5 of the optical pickup 4 for emitting an optical beam with a reading power from the semiconductor laser 5.

The optical beam for reading emitted from the semiconductor laser 5 is converted to the parallel light by the collimator lens 22, and then, passes through the beam splitter 6 to be focused by the objective lens 7. Then, the optical beam for reading focused by the objective lens 7 is irradiated onto the medium 100 rotatively operated by the spindle motor 2. An optical spot is formed along a pit array formed on the medium 100.

The optical beam for reading irradiated onto the medium 100 is reflected by the medium 100 to become return light including a signal component written as the pit array to the medium 100. The return light passes through the objective lens 7 to be reflected by the beam splitter 6, and then, is focused by the focusing lens 23 to enter the optical detector 24 to be received.

The optical detector 24 performs photoelectric conversion and current voltage conversion on the received return light to generate a voltage signal corresponding to the return light. Then, the voltage signal generated by the optical detector 24 is supplied to the RF signal processing part 12.

The RF signal processing part 12 generates an RF reading signal, a focus error signal, a tracking error signal and a wobble signal based on the voltage signal supplied from the optical detector 24. The focus error signal and the tracking error signal generated by the RF signal processing part 12 are supplied to the servo control part 10. The servo control part 10 drives the biaxial actuator, not shown, based on the focus error signal and the tracking error signal under the control of the system control part 11 and performs focusing servo and tracking servo in the optical pickup 4.

In addition, the wobble signal generated in the RF signal processing part 12 is supplied to the ATIP decoder 19. The ATIP decoder 19 performs the CRC check and decoding processing of the wobble signal under the control of the system control part 11 to generate an ATIP signal showing SYNC and time axis information. The ATIP signal is supplied to the system control part 11. The system control part 11 performs control of the access mechanism, not shown, and the spindle servo based on the ATIP signal.

In addition, the RF reading signal generated by the RF signal processing part 12 is supplied to the digitization/clock generation part 13 where digitization processing is performed for conversion to the digital data Then, the digital data is supplied to the data processing part 14.

The digital data supplied to the data processing part 14 is subject to the EFM-demodulation processing, deinterleave processing, error correction processing with CIRC and the like in the data processing part 14. Further, the digital data is subject to the descramble processing and error correction processing with ECC to be stored into the buffer memory 15 such as a RAM, and then, is supplied as reading data via the interface 16 to the host computer. This allows the information written to the medium 100 to be read.

Figure 3:
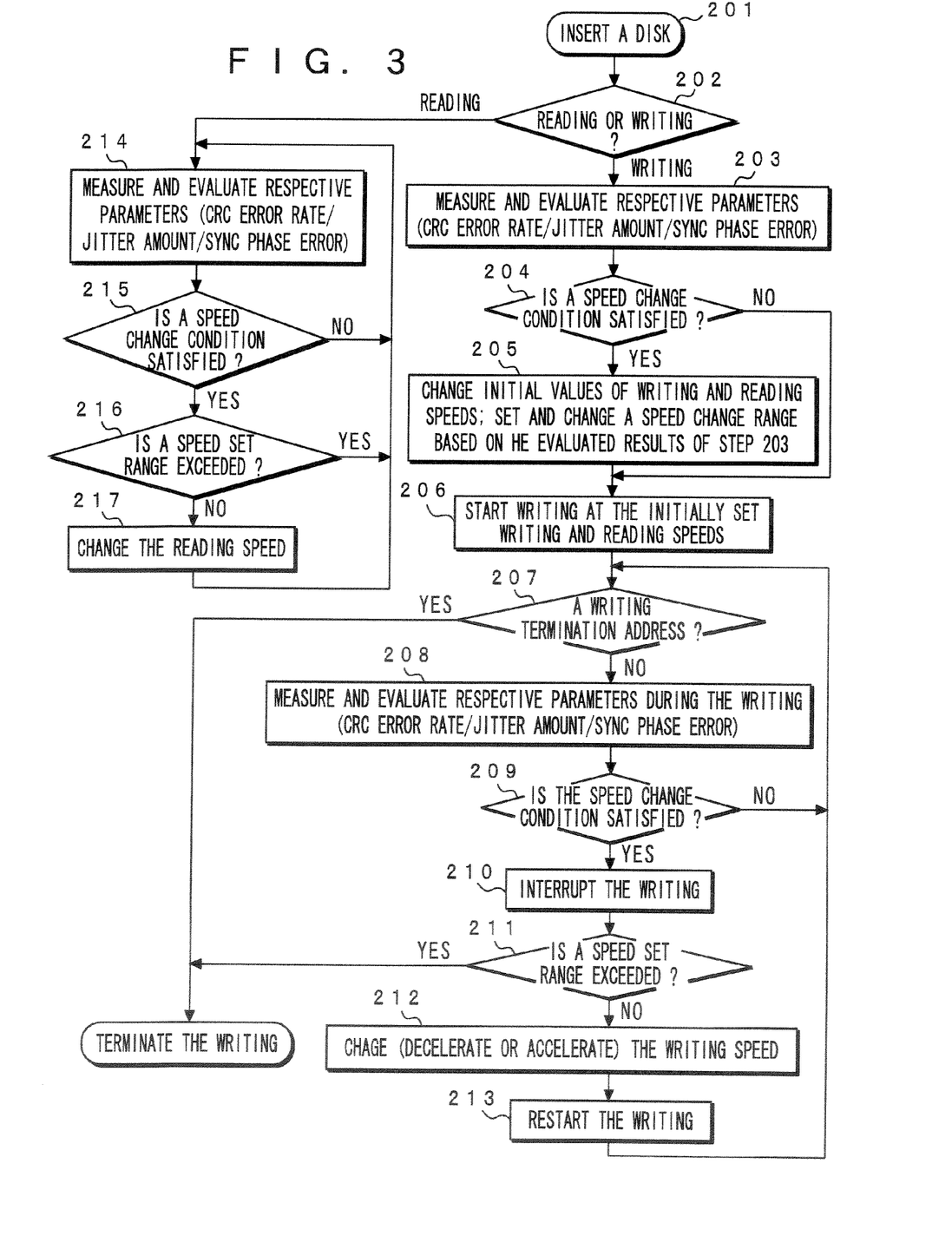
FIG. 3 is a diagram showing a control flow in the optical writing medium device of FIG. 1.

Next, in the writing and reading operations of information to/from the medium 100, an operation in which the accuracy of the wobble signal is evaluated and the operations of the optical writing medium device 1 are controlled according to the evaluated result will be described. FIG. 3 shows a flowchart of this control.

When the routine is advanced from step 201 where a disk is inserted to step 202, it is determined which any one operation of a writing operation and a reading operation should be done in this step 202. Here, at the writing operation, the routine is advanced to step 203, and at the reading operation, the routine is advanced to step 214.

In the step 203, measurement of parameters is carried out and an evaluation is then performed using the measured parameters. In other words, to evaluate the accuracy of the wobble signal, the system control part 11 performs statistical processing such as simple average or moving average of the respective evaluated parameters of the CRC error rate detected by the ATIP decoder 19, the FMDT jitter amount obtained by the jitter measurement part 20, and the SNYC phase error obtained by the phase error measurement part 21. Subsequently, the system control part 11 compares the respective statistical results thus obtained of the CRC error rate of the ATIP signal, the FMDT jitter amount and the SYNC phase error with the respective ranges of set values stored into the EEPROM 28.

Figure 4A:
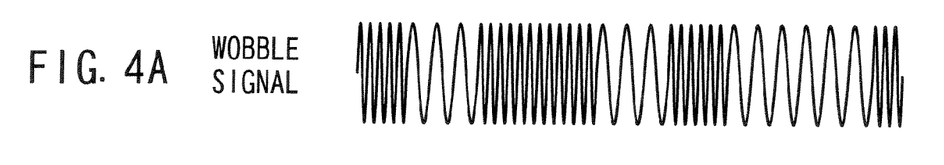
FIGS. 4A to 4D are waveform charts each showing a wobble signal, an ATIP eye pattern generated therefrom, an FMDT signal and an FMCK signal.
Figure 4B:
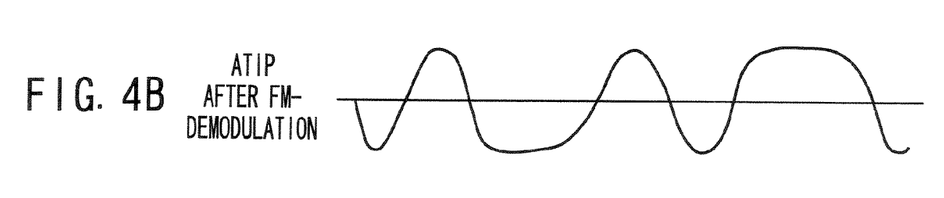
Figure 4C:
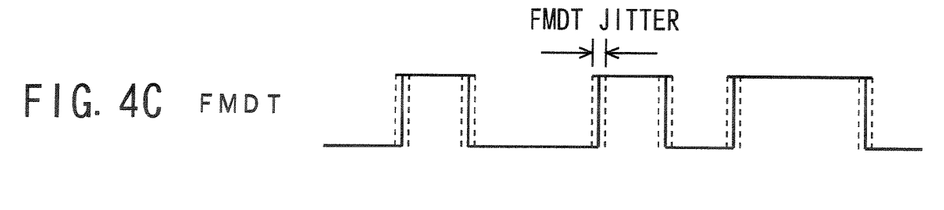
Figure 4D:
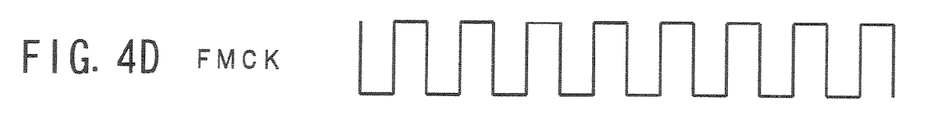

FIGS. 4A to 4D show signals generated from the wobble signal. The wobble signal shown in FIG. 4A is decoded, that is, the wobble signal is subject to FM-demodulation, thereby obtaining an ATIP signal shown in FIG. 4B. The ATIP signal is digitized, thereby obtaining an FMDT signal shown in FIG. 4C, and then, an FMCK signal shown in FIG. 4D is extracted as a clock by looping the FMDT signal in a PLL. The FMCK signal is used in the spindle motor. The FMDT signal is also buffeted by the FMCK signal, thereby obtaining the ATIP signal. The FMDT jitter is deviation of the FMCK signal and the FMDT signal on a time axis, which is Bi-Phase modulated and has three kinds of pulse widths of 1T to 3T. Here, in the jitter measurement, all Ts of 1T to 3T may be measured. For example, only 1T may be simply measured.

Figure 5:
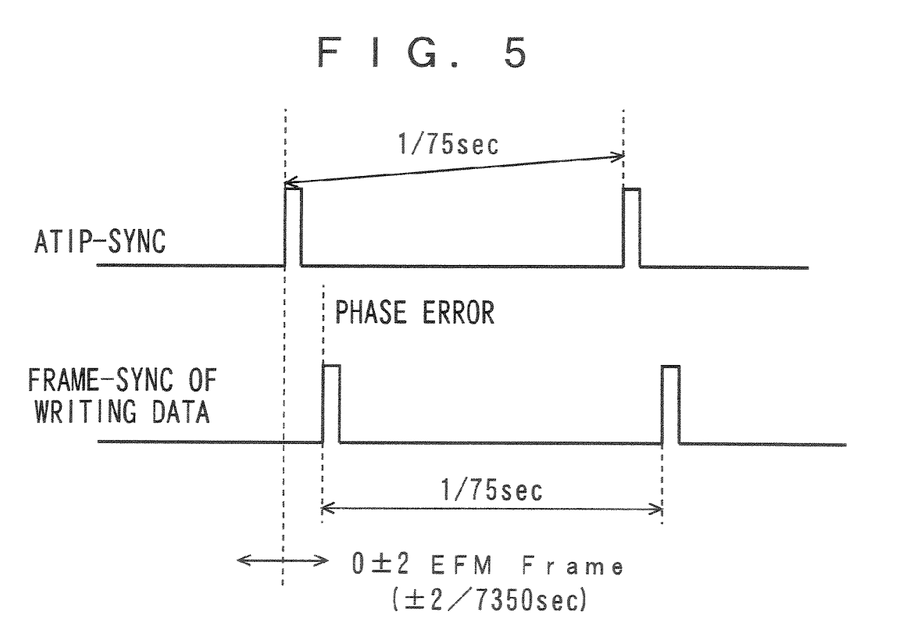
FIG. 5 is a diagram showing the relation between the synchronization signal of an ATIP and the frame synchronization signal of writing data.

FIG. 5 shows the relation between ATIP-SYNC signal as a synchronization signal of the ATIP and FRAME-SYNC signal as a frame synchronization signal of the writing data. 75 frames exist in one second in relation to each of the frame of the ATIP signal and one frame (2352 bytes) of the writing data. When the writing data is written, the writing is performed while synchronizing the frame of the ATIP signal with the frame of the writing data. In other words, the spindle servo is performed with the phase error of the synchronization signal of the ATIP and the frame synchronization signal of the writing data being made zero. In the CD-R and CD-RW standards, the phase error is always satisfied in any location on the medium within 0±2EFM Frame (136 μsec at a standard speed). The phase error measurement part 21 measures the phase error for supplying it to the system control part 11. From this, the system control part 11 performs the spindle servo based on the measured result of the phase error and performs statistical processing such as simple average or moving average of the measured value of the phase error.

The system control part 11 decides whether the writing and reading speeds are changed or not according to a predetermined decision condition based on the evaluated results of the above three evaluated parameters.

In the decision condition, the following various modifications can be made: ① the case that any one of the three evaluated parameters is deviated from the set value range, ② the case that two of the three evaluated parameters are deviated from the set value ranges, and ③ the case that all of the three evaluated parameters are deviated from the set value ranges.

In step 204, it is determined whether a speed change condition is satisfied or not. Here, when deciding in the above step 203 that the writing and reading speeds are changed, the routine is advanced to step 205, and when it has not decided that the writing and reading speeds are changed, the routine is advanced to step 206.

In the step 205, the writing and reading speeds are changed. In other words, when the evaluated parameter exceeds the range of set values, the writing speed is decelerated and the decelerated writing speed is set as an initial value. Reversely, when the evaluated parameter does not reach the range of set values, the writing speed is accelerated and the accelerated writing speed is set as an initial value. In this manner, the processing of the steps 201 to 205 is performed so that the optical writing medium device 1 may become the state before starting writing, that is, the "ready" state that writing of information can be performed to the medium 100.

In the step 206, the writing is started at a set speed and the routine is advanced to step 207. In the step 207, it is determined whether a writing termination address is provided or not. Here, when the writing termination address is provided, the writing is terminated. When the writing termination address is not provided, the routine is advanced to step 208.

In the step 208, the same processing as that of the step 203 is performed during the writing operation and the routine is advanced to step 209.

In the step 209, it is determined whether the speed change condition is satisfied or not. Here, when it has been determined, in the step 208, that the writing and reading speeds are changed, the routine is advanced to step 210. When it has not been decided that the writing and reading speeds are changed, the routine is returned to step the 207.

In the step 210, the writing is interrupted or the writing is interrupted at the point at which the writing can be interrupted and the routine is advanced to step 211. In the step 211, it is determined whether a speed set range is exceeded or not. The speed set range shows the upper limit and the lower limit of the range for changing the writing speed, which are set previously, based on, for example, the above-described evaluated parameters, the characteristic of the medium 100 of whether coping with a high-speed operation is enabled or not, and the eccentric amount of the medium 100. Here, when the changed speed exceeds the speed set range, the writing operation is terminated. In addition, when it does not exceed the speed set range, the routine is advanced to step 212.

In the step 212, the writing speed is changed and the routine is then advanced to step 213. In the step 213, the writing is restarted at the changed speed and the routine is returned to the step 207. In other words, when the evaluated parameter exceeds the range of set values, the writing is interrupted to decelerate the writing speed for restarting the writing. Reversely, when the evaluated parameter does not reach the range of set values, the writing is interrupted to accelerate the writing speed for restarting the writing.

Here, the point at which the writing can be interrupted refers to, for example, a writing termination point of the data of one packet in the case of writing by a packet write method. An optical writing medium device having a function of interrupting the writing and restarting the writing from the position immediately after the interrupting, can interrupt the writing immediately after establishing the writing speed change condition.

As a timing for restarting the writing, for example, there exists a timing at which deceleration of the writing speed is completed, a timing at which more than a fixed amount of writing data is stored into the buffer 15, or a timing at which a fixed time elapses from stopping.

After changing the writing speed, when the writing speed change condition is established again, the writing is interrupted again and the writing speed is then decelerated or accelerated to allow the writing to restart. Thereafter, changing of the writing speed is repeated, thereby completing the writing.

In addition, in reading the information from the medium 100, the routine is advanced from the step 202 to the step 214. In the step 214, as in the step 203, measurement of parameters and evaluation are performed using the measured parameters.

In step 215, it is determined whether a speed change condition is satisfied or not. Here, when the speed change condition is not satisfied, the routine is returned to the step 214. When the speed change condition is satisfied, the routine is advanced to step 216.

In the step 216, it is determined whether a speed set range is exceeded or not. The speed set range shows the upper limit and the lower limit of the range for changing the reading speed, which are set previously as in the case of the speed set range of the above-described writing speed. Here, when the changed speed exceeds the speed set range, the routine is returned to the step 214. In addition, when it does not exceed the speed set range, the routine is advanced to step 217.

In the step 217, the reading speed set under the CLV or CAV condition is changed. In other words, when the evaluated parameter exceeds the range of set values, the reading speed is decelerated while continuing the reading. Reversely, when the evaluated parameter does not reach the range of set values, the reading speed is accelerated. Thereafter, change of the reading speed is repeated for completing the reading.

As described above, according to the optical writing medium device 1 embodying the present invention, in order to evaluate the accuracy of the wobble signal, the evaluated parameters such as the CRC error rate of the ATIP signal, the FMDT jitter amount, and the phase error of the ATIP synchronization signal and the frame synchronization signal of the writing data are evaluated based on the ranges of set values. When the evaluated parameter is deviated from the ranges of set values, the writing and reading speeds are changed so that the reading accuracy of the wobble signal can be increased, thereby preventing disabled reading of information from the medium 100 and occurrence of a writing error.

It should be noted that the present invention is not limited to only the above embodiment, and needless to say, various modifications can be added within the scope without departing from the purpose of the present invention.

The optical writing medium device targeted by the present invention can be applied not only to an optical writing medium device using a CD-RW described in the above embodiment as an optical recording medium, but also to an optical writing medium device which uses an optical disk in which wobble including time axis information is provided along a recording track such as a CD-R, DVD-R, DVD-RW, DVD+R, DVD+RW and DVD-RAM and an optical recording medium such as an optical card other than the disk.

As described above in detail, according to the optical writing device, the optical reading device, the recording-medium-writing method and the recording-medium-reading method of the present invention, reading of address information included in wobble is stable and information can be stably written and read to/from an optical recording medium.

INDUSTRIAL APPLICABILITY

The present invention is useful when writing and reading information to/from an optical recording medium and is preferred for suppressing occurrence of a reading error of time axis information from wobble to stably write and read information.

What is claimed is:

1. An optical writing device comprising: wobble signal generation means for generating a wobble signal from an electric signal outputted from an optical pickup; evaluation means for evaluating accuracy of the wobble signal generated by said wobble signal generation means; and control means for allowing control, in performing writing to an optical disk, for interrupting a writing operation when the accuracy of the wobble signal evaluated by said evaluation means is deviated from a predetermined range wherein said control means performs control, in performing writing, for interrupting the writing operation, decelerating a writing speed, and restarting the writing operation, when deciding that the accuracy of the wobble signal evaluated by said evaluation means is lower than a lower limit of the predetermined rang % and said control means performs control for interrupting the writing operation, accelerating the writing speed, and restarting the writing operation, when deciding that the accuracy of the wobble signal is higher than an upper limit of the predetermined range wherein a synchronization signal for frame synchronization with writing data is added to the wobble signal and phase error measurement means for measuring a phase error between the synchronization signal and a synchronization signal of the writing data is further provided; and said evaluation means evaluates the accuracy of the wobble signal at least based on the phase error measured by said phase error measurement means.

2. The optical writing device according to claim 1, the device further comprising:
   jitter measurement means for measuring a jitter amount of the wobble signal, wherein said evaluation means evaluates the accuracy of the wobble signal at least based on the jitter amount of the wobble signal measured by said jitter measurement means.

3. The optical writing device according to claim 1,
   wherein an error detecting code is added to the wobble signal and a decoding means performs error detection with the error detecting code at decoding time axis information generated from the wobble signal; and
   said evaluation means evaluates the accuracy of the wobble signal at least based on the error rate of the error detection.

4. An optical writing device comprising: a wobble signal generator configured to generate a wobble signal from an electric signal outputted from an optical pickup; an evaluator configured to evaluate accuracy of the wobble signal generated by said wobble signal generator; a controller configured to control, in performing writing to an optical disk, an interrupting of a writing operation when the accuracy of the wobble signal evaluated by said evaluator is deviated from a predetermined range; said controller is further configured to control, in performing writing, the interrupting of the writing operation, decelerating a writing speed, and restarting the writing operation, when deciding that the accuracy of the wobble signal evaluated by said evaluator is lower than a lower limit of the predetermined range; and said controller is further configured to control the interrupting of the writing operation, accelerating the writing speed, and restarting the writing operation, when deciding that the accuracy of the wobble signal is higher than an upper limit of the predetermined range wherein a synchronization signal for flame synchronization with writing data is added to the wobble signal and a phase error measurement section configured to measure a phase error between the synchronization signal and a synchronization signal of the writing data is further provided; and said evaluator evaluates the accuracy of the wobble signal at least based on the phase error measured by said phase error measurement section.

5. The optical writing device according to claim 4, further comprising:
   a jitter measurement section configured to measure a jitter amount of the wobble signal, wherein said evaluator evaluates the accuracy of the wobble signal at least based on the jitter amount of the wobble signal measured by said jitter measurement section.

6. The optical writing device according to claim 4, wherein an error detecting code is added to the wobble signal and a decoder performs error detection with the error detecting code at decoding time axis information generated from the wobble signal; and
   said evaluator evaluates the accuracy of the wobble signal at least based on the error rate of the error detection.

7. The optical writing device according to claim 1, wherein said evaluation means includes
   a phase error measurement means for measuring a phase error between a synchronization signal for frame synchronization and a synchronization signal of the writing data,
   a jitter measurement means for measuring a jitter amount of the wobble signal, and
   a decoding means for performing error detection using an error detecting code,
   wherein said evaluation means evaluates the accuracy of the wobble signal based on the phase error, the jitter amount, and the error detection.

* * * * *